US009141578B2

(12) United States Patent
Mashtizadeh et al.

(10) Patent No.: US 9,141,578 B2
(45) Date of Patent: Sep. 22, 2015

(54) ROBUST LIVE MIGRATION USING SHARED FILESYSTEM (71) Applicant: VMware, Inc., Palo Alto, CA (US)

(72) Inventors: Ali Mashtizadeh, El Cerrito, CA (US); Gabriel Tarasuk-Levin, Mountain View, CA (US)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 14/202,184

(22) Filed: Mar. 10, 2014

(65) Prior Publication Data

US 2014/0189041 A1 Jul. 3, 2014

Related U.S. Application Data (63) Continuation of application No. 13/182,303, filed on Jul. 13, 2011, now Pat. No. 8,671,238.

(60) Provisional application No. 61/363,924, filed on Jul. 13, 2010.

(51) Int. Cl.
*G06F 9/455* (2006.01)
*G06F 12/08* (2006.01)
*G06F 15/173* (2006.01)
*G06F 9/48* (2006.01)
*G06F 3/06* (2006.01)

(52) U.S. Cl.
CPC ...... *G06F 15/17331* (2013.01); *G06F 9/45545* (2013.01); *G06F 9/45558* (2013.01); *G06F 9/4856* (2013.01); *G06F 12/08* (2013.01); *G06F 3/0647* (2013.01); *G06F 2009/4557* (2013.01); *G06F 2009/45583* (2013.01)

(58) Field of Classification Search
USPC .......................... 711/6, 147, E12.065; 718/1
See application file for complete search history.

(56) References Cited

U.S. PATENT DOCUMENTS

| | | | |
|---|---|---|---|
| 7,484,208 B1 | 1/2009 | Nelson | |
| 2009/0204718 A1 | 8/2009 | Lawton et al. | |
| 2009/0222558 A1 | 9/2009 | Xu et al. | |
| 2010/0023565 A1 | 1/2010 | Colbert et al. | |
| 2010/0094948 A1 | 4/2010 | Ganesh et al. | |
| 2011/0179415 A1 | 7/2011 | Donnellan et al. | |
| 2011/0197039 A1* | 8/2011 | Green et al. ................. | 711/162 |
| 2011/0289205 A1 | 11/2011 | Hansson et al. | |
| 2011/0320556 A1 | 12/2011 | Reuther | |

* cited by examiner

*Primary Examiner* — Hal Schnee (57) ABSTRACT

A method for transferring guest physical memory from a source host to a destination host during live migration of a virtual machine (VM) involves (a) transmitting pages of the guest physical memory from the source host to the destination host over a network connection, (b) transferring state information from the source host to the destination host, (c) while performance benefits regarding continued access to the guest physical memory on the source host persist, using the transferred state information to run the VM on the destination host in place of running the VM on the source host, and (d) while the VM is running on the destination host, writing pages of the guest physical memory from the source host to a shared datastore such that the destination host can retrieve the written guest physical pages from the shared datastore.

20 Claims, 5 Drawing Sheets

ROBUST LIVE MIGRATION USING SHARED FILESYSTEM

CROSS-REFERENCE TO RELATED APPLICATION

This application claims the benefit of U.S. patent application Ser. No. 13/182,303, filed Jul. 13, 2011, issued as U.S. Pat. No. 8,671,238, which claimed priority from U.S. Provisional Patent Application Ser. No. 61/363,924, filed Jul. 13, 2010, the entire contents of which are incorporated by reference herein.

BACKGROUND

In the world of virtualization infrastructure, the term, "live migration" refers to the migration of a virtual machine (VM) from a source host computer to a destination host computer. Each host computer is a physical machine that may reside in a common datacenter or distinct datacenters. On each host, virtualization software includes hardware resource management software, which allocates physical resources to running VMs on the host and emulation software which provide instances of virtual hardware devices, such as storage devices, network devices, etc., that are interacted with by the guest system software, i.e., the software executing "within" each VM. Virtualization software running on each host also cooperates to perform the live migration.

Exemplary implementations of live migration of VMs are described in detail in U.S. Pat. No. 7,484,208 which issued on Jan. 27, 2009, and U.S. Pat. No. 7,680,919, which issued on Mar. 16, 2010. These two patents are expressly incorporated by reference herein. However, in general terms, one key aspect of performing live migration is copying the state of the VM from the source host to the destination host in a manner that allows minimal or insignificant disruption of the VM's execution at the time of the transfer from the source to the destination. A challenging component of this state information to be transferred is the contents of the guest physical memory. A VM's guest physical memory comprise those pages of machine memory (i.e., actual physical memory residing in the host) that are mapped or allocated to the VM being migrated. The guest physical memory address space is treated by the guest system software (e.g., the guest operating system) as actual physical memory, but is of course mapped by the virtualization software to physical pages of machine memory. The main reason it is challenging to transfer the guest physical memory to the destination computer in a live migration is because the VM is allowed to continue to execute during the transfer, and therefore continues to update the guest physical memory as the guest physical memory is being copied or transferred.

To copy guest physical memory to a destination host while the VM is executing, an iterative pre-copy scheme may be used, as described in detail in the patents incorporated by reference above. In general terms, the guest physical memory pages are iteratively copied to the destination host prior to execution of the migrating VM on the destination host. This involves multiple copying operations beginning with copying the entire contents of the guest physical memory to the destination host, then repeatedly copying the pages dirtied (i.e., written to by the VM) since the previous copy operation. Provided the bandwidth for transmitting the copied pages between the source and destination hosts exceed changes to the guest memory pages caused by the VM, the pre-copy process will eventually converge to a very small set of pages that can then be successfully copied to the destination host along with other VM state information after stunning (pausing execution of) the VM on the source host so the VM can then be resumed on the destination host with minimal or insignificant interruption.

In some situations, e.g., in cases where the pre-copy technique described above cannot converge, the execution of the VM is transferred to the destination host even before all of the guest physical memory pages of the VM are copied to the destination host. As the VM runs on the destination host, and encounters pages that it lacks, but remain present on the source host, the VM demand faults those pages over the network from the source host. This process is called "resume during page-in" or RDPI, and enables the system to guarantee transparent migration success, even for VMs having large working sets of memory pages which have not been pre-copied.

During this period of RDPI, the failure domain of the VM is extended because the VM's memory exists both on the source host and the destination host. For example, if the source host or the destination host crashes during RDPI, the VM needs to be terminated. The same is true when there is a network failure.

SUMMARY

One or more embodiments of live migration involve (a) transmitting pages of guest physical memory from a source host to a destination host over a network connection, (b) transferring state information from the source host to the destination host, (c) while performance benefits regarding continued access to the guest physical memory on the source host persist, using the transferred state information to run the VM on the destination host in place of running the VM on the source host, and (d) while the VM is running on the destination host, writing pages of the guest physical memory from the source host to a shared datastore such that the destination host can retrieve the written guest physical pages from the shared datastore.

One or more embodiment provides a technique to protect the VM against network failure or host failure during RDPI. In this technique, after the RDPI process is initiated, a log of the executing behavior of the VM running on the destination host is recorded and transmitted to the source host. When there is a network failure or a destination host failure, the VM can resume execution at the source host by replaying the log transmitted by the destination host.

Further embodiments of the present invention include, without limitation, a system configured to implement one or more embodiments of the present invention set forth above.

DETAILED DESCRIPTION

Figure 1:
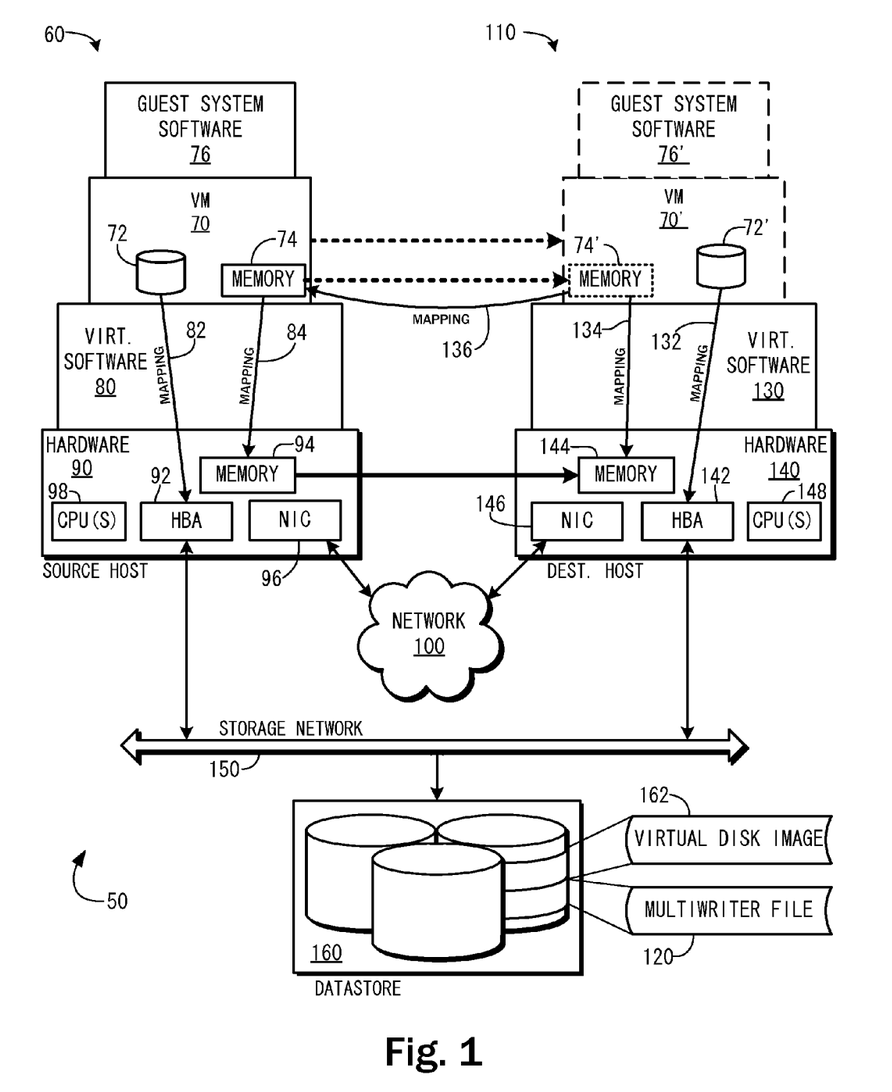
FIG. 1 shows an overview of a virtualization infrastructure supporting live VM migration.

FIG. 1 shows an overview of a virtualization infrastructure 50 supporting robust live migration. A source host 60 includes a hardware platform 90 on which virtualization software 80 executes. Virtualization software 80 comprises system software (not shown) that manages and allocates hardware resources such as processor 98 scheduling, memory 94, and host bus adapter (HBA) 92 and network interface (NIC) 96 bandwidth. In addition, virtualization software 80 includes a VM monitor (VMM) component (not shown) that is responsible for emulating system components to support execution of VM 70. Although only one VM is shown executing on virtualization software 80, it should be recognized that any number of VMs may execute concurrently (i.e., either timewise interleaved on a single processor or simultaneously on a plurality of processors), the number of VMs being limited only by the sufficiency of hardware resources to support reasonable VM execution.

Virtualization software 80 is responsible for mapping virtual hardware resources associated with VM 70 to physical hardware resources so that each virtual hardware resources is backed up by some physical resource. For example, guest physical memory 74 is mapped to machine memory 94 by memory mapping 84. Memory mapping 84 may be implemented, for example, using a guest physical to machine memory page table, which is maintained by virtualization software 80. Guest physical memory 74 is memory treated by guest system software 76 as physical memory. Guest system software 76 is software executing on VM 70, including a guest operating system and guest applications. The guest operating system may be a commodity operating system such as Microsoft Windows®, OS/X®, Linux®, or some other guest system software designed to execute on virtual CPU(s) (not shown) exported by virtualization software 80. Virtual disk 72 may be mapped to a virtual disk image file 162 maintained on datastore 160 by virtualization software 80 according to disk mapping 82.

Destination host 110 includes a hardware platform 140 having physical hardware including a host bus adapter (HBA) 142, machine memory 144, a network interface (NIC) 146, and one or more CPU 148. In addition, destination host 110 includes virtualization software 130 executing on hardware platform 140. Virtualization software 80 executing on source host 60 is in communication via network 100 with virtualization software 130 executing on destination host 110.

In response to a command from a user or automated system (not shown) to live-migrate VM 70 from source host 60 to destination host 110, virtualization software 80 and virtualization software 130 cooperate to begin copying guest physical memory 74 from the source host 60 to the destination host 110. Such a command may originate over network 100. In one embodiment, virtualization software 80 accesses guest physical page tables (illustrated by mapping 84) to identify machine pages in machine memory 94 to be copied to machine memory 144 in destination host 140. This copying may occur over network 100 while VM 70 continues to execute, and therefore issue writes and reads to guest physical memory 74.

In one embodiment, guest physical memory 74 is copied from source VM 60 to destination VM 110 in an iterative manner, wherein at each iteration, only those pages of guest physical memory 74 that have been written to since the last iteration are copied to destination host 110. Depending on the working set of pages of whatever guest system software that is running in VM 70 and the available bandwidth of the network connection from source host 60 to destination host 110, the iterative copying of guest physical memory 74 may or may not converge on a set of pages that is sufficiently small to enable spontaneous transfer of the execution of VM 70 to destination host 110. Such a spontaneous transfer involves stunning the VM 70 on the source host 60, copying remaining dirty guest physical pages to destination host 110, and resumption of execution of the VM, referred to now as VM 70' on the destination host 110. This process can occur sufficiently fast so that there is minimal or no significant "down time" during the transfer, e.g., on the order of one half second or less.

However, if the working set of guest physical memory 74 is too large or the available bandwidth of the network connection sufficiently small, then an alternative process, referred to as "resume during page in" or RDPI, is initiated. In RDPI, once virtualization software 80 determines that the iterative copy technique is not converging to a sufficiently small set of guest physical pages for spontaneous transfer as previously described, then the VM 70 is stunned on source host 60, the processor and other state (except remaining guest physical memory state) is copied to destination host 110, and VM 70' is resumed on the destination host without the full set of working guest physical memory in residence on the destination host 110.

In this case, when guest system software accesses a guest physical page that is mapped to a machine memory page that has yet to be copied to destination host 110, a guest physical page fault occurs. The guest physical page fault is handled by a guest physical page fault handler portion of virtualization software 130, which sends a request for the faulted page, referenced by its guest physical page number, via network 100 to source host 60. Source host 60 receives the request for the faulted page, accesses its page table (mapping 84) to identify the machine page location of the contents of the faulted guest physical page, and responds to the request from the destination host with the requested page data, so that the fault on the destination host 110 can be cleared and guest execution resumed with the access to the requested guest physical page. In addition, uncopied guest physical pages may be sent from source host 60 to destination host 110 in a manner, e.g., using a background process, so as to not significantly disrupt execution of VM 70'. The RDPI process may persist for some time (e.g., on order of a few seconds to several minutes for terabyte VMs) until all the guest physical pages are copied from the source host 60 to the destination host 110.

Since the RDPI process persists for some time, the VM may be vulnerable to a disruption of network connection 100. During RDPI, execution occurs in VM 70' while some guest physical memory of VM 70' is mapped to machine memory 94 on source host 60 as shown by mapping arrows 136 and 84. Therefore the network connection between source and destination hosts becomes critical to the execution of VM 70'. If the network connection is disrupted during RDPI, then VM 70' must halt, and cannot be resumed, or saved to disk, until the network connection is restored. In one embodiment of the invention, therefore, a multiwriter file 120 is provided on datastore 160 (or any commonly-accessible storage location) to provide a backup datapath to handle guest physical page faults during RDPI, should the network connection between source and destination hosts be disrupted. The term, "multiwriter file" refers to a file that is or may be written to by more than one host.

Figure 2:
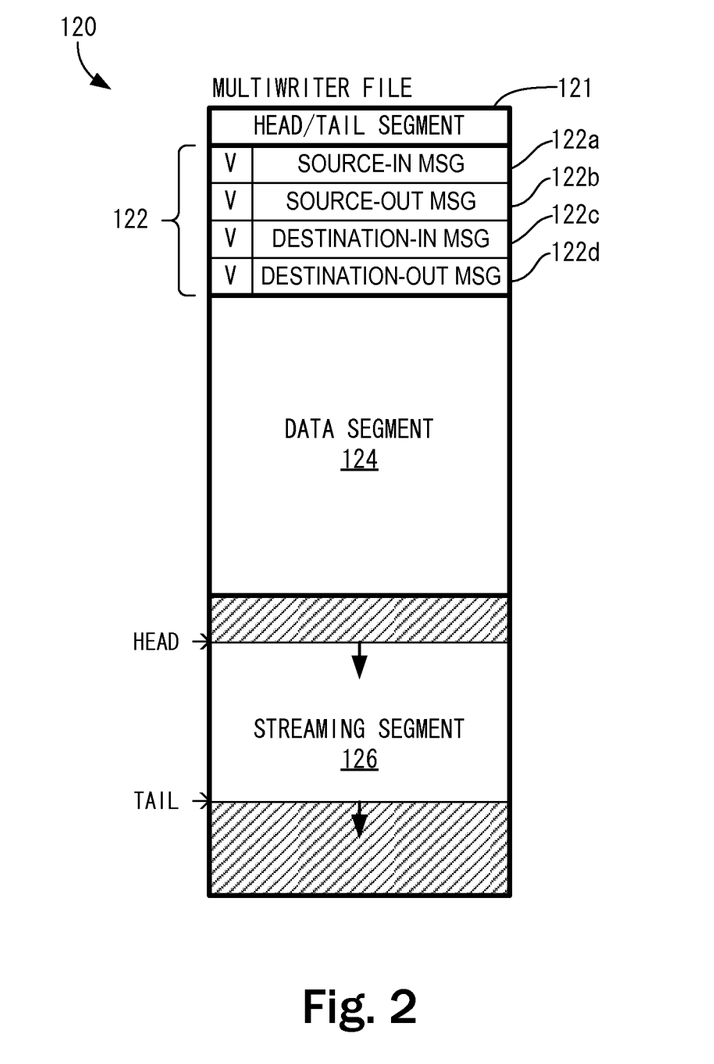
FIG. 2 shows an exemplary structure of a multiwriter file enabling an alternate communication channel between source and destination hosts during live migration.

FIG. 2 shows an exemplary multiwriter file 120. Although in this embodiment, a single multiwriter file is provided with multiple segments, it is contemplated that other embodiments may provide a plurality of multiwriter files to establish multiple communication channels. In this embodiment, multiwriter file 120 is divided into a head/tail segment 121, a messaging segment 122, data segment 124, and streaming segment 126. Streaming segment 126, described in more detail below, is treated as a circular buffer with the beginning and end of the written but not yet read data being identified by head and tail pointers provided in head/tail segment 121. The head pointer indicates the start of a region of the streaming segment to which the source host is writing data, whereas the tail pointer indicates the start of a region where the destination host is reading from, with the writing wrapping from the end back to the beginning of streaming segment 126, as commonly understood with circular buffers.

Message segment 122 provides four slots for sending and receiving messages by the source and destination hosts 60, 110. In this case the source host may send a message to the destination host by writing to the source-in message slot 122*a* and respond to messages from the destination host by writing to the destination-out slot 122*d*. Likewise, the destination host may send messages to the source host by writing to the destination-in message slot 122*c* and respond or acknowledge messages from the host by writing to the source-out message slot 122*b*. Each message slot has a "valid" flag ("V") that is set at the time the host writes to its corresponding message slots and cleared when the host retrieves the message from its corresponding message slots. This avoids collisions.

Data segement 124 provides variable-length data payloads that accompany some message types, according to whatever protocol is in place for mutual communication between source and destination hosts.

In one embodiment, destination host 110 repeatedly polls source-in message slot 122*a* at until the valid flag is set by source host 60, then reads the contents of the corresponding message slot; if the message indicate a data payload, reads the data payload from data segment 124; and clears the valid flag. In response to retrieval of each message by destination host 110, a reply message may be written to source-out message slot 122*b*. As with source message slots 122*a*, 122*b*, destination host 110 has corresponding destination-in and destination-out message slots 122*c*, 122*d*.

Asynchronous communications having a message queue in multiwriter file 120 is also contemplated. In this case, message segment 122 may be implemented as a circular buffer with reads following writes and each host maintaining appropriate pointers to the oldest and newest unread message.

Streaming segment 126 may provide a mechanism to transfer contents of guest physical pages from source host 60 to destination host 110. In one embodiment, source host 60 continually writes outstanding pages of guest physical memory, i.e., the contents of machine memory pages mapped to guest physical pages identified as having not yet been transferred to destination host 110. Meanwhile, destination host 110 polls for updates to the streaming segments, e.g., by checking the values in the head/tail segment 121. A valid flag may also be provided for streaming segment 126, which would operate as described above for message segment 122. When new guest physical pages are written, destination host 110 may read them from streaming segment 126, and mark and clear the valid flag, thereby indicating to source host 60 that streaming segment 126 may be reused to send additional guest physical pages.

In one embodiment, the protocol for messaging and streaming memory pages using multiwriter file 120 mirrors the protocol used during RDPI over network 100. In this manner, upon detecting a network timeout, all RDPI communication may be simply redirected over multiwriter file 120 through a generalized communication channel abstraction layer. Not only does this retain the running RDPI VM in the case of network failure, but it shields the entire live migration communication stack from needing any additional complexity in handling network failures during RDPI. In alternate embodiments, or as may be configured by an administrator, multiwriter file 120 may be a primary datapath for live migration, or as a multi-streaming/pathing mechanism to load balance traffic between the network connection and the shared datastore.

In one embodiment, data segment 124 is used to provide guest physical pages in response to page faults. In a typical scenario (referring to FIG. 1) VM 70' may fault during RDPI on destination host 110. Virtualization software 130 writes a message to source host 60 using destination-in message slot 122*c* (FIG. 2), the message essentially requesting the contents of the faulted page. Source host 60 invalidates the destination-in message slot 122*c*, retrieves the contents of the faulted page and writes the contents to data segment 124, and indicates completion of the request, i.e., writes a reply, in destination-out message slot 122*d*. Destination host 110 can then read the reply in destination-out message slot 122*d*, read the contents of the faulted page from data segment 124, and invalidate the destination-out message slot 122*d* by clearing the valid flag.

In another embodiment, a multiwriter file is not used. Instead, source host 60 may stream data to the shared datastore simultaneously with the transmission over the network. If source host 60 were to fail, destination host 110 need only verify that source host 60 was able to write any remaining pages to the disk, thus closing the host failure window by sharing bandwidth between the shared datastore and the NIC. In one implementation, pages may be transmitted in order over the network connection, and in reverse order (in terms of guest physical page number) to the persistent shared file. In this way, the time window of the host failure vulnerability is cut in half.

Figure 3:
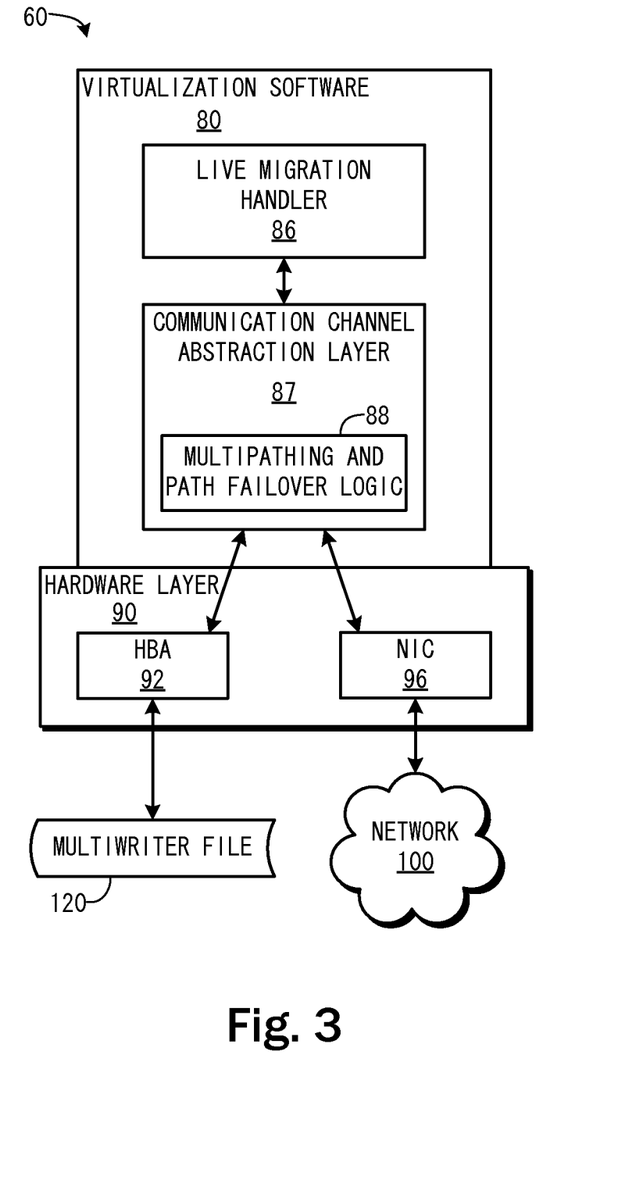
FIG. 3 shows a block diagream illustrating by way of example a logic for implementing a communication channel abstraction layer in virtualization software.

FIG. 3 shows an exemplary software architecture for implementing a communication channel abstraction layer 87 within virtualization software 80. Live migration handler 86 orchestrates the copying of data from source host 60 in response to instructions received from a user or automated system (not shown). In the present example, during RDPI pageout for a live migration, messages between live migration handler 86 and destination host 110 (FIG. 1) may be passed through communication channel abstraction layer 87. Multipathing and path failover logic 88, which may be implemented as one component of communication channel abstraction layer 87, may monitor these communications to ensure continued presence of a network connection over network 100 to destination host 110. In the case of a timeout error over network 100, multipathing and path failover logic 88 may immediately begin communicating using multiwriter file 120, e.g., by retransmitting messages and/or guest physical pages for which receipt by the destination host has not been acknowledged.

Figure 4:
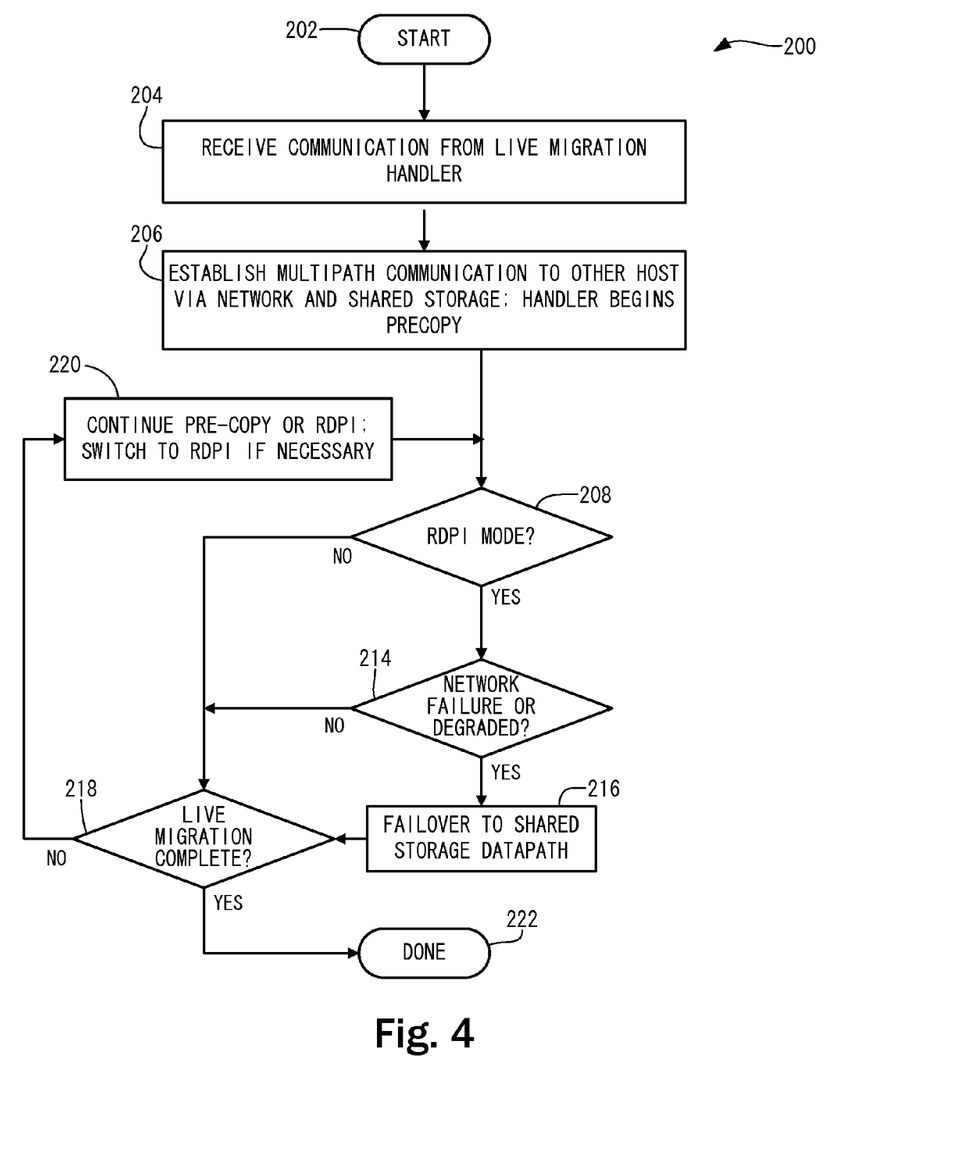
FIG. 4 shows a flowchart illustrating by way of example a procedure carried out by multipathing and path failover logic.

FIG. 4 shows a flowchart 200 illustrating by way of example a method for implementing multipathing and path failover logic described above with reference to FIG. 3. This procedure may execute on both the source and destination hosts. In one embodiment, either the source host or the destination host can initiate a failover in response to a detected network failure or degradation as described below. In addition, the logic implemented by communication abstraction layer 87 may be agnostic and unaware of the common communication protocol implemented by live migration handler 86. In this manner, the communication channel abstraction layer may operate in a transparent manner with respect to the live migration handler. The procedure starts as shown at start block 202 and flows to operation 204 where communication is received from live migration handler 86 (FIG. 3). The communication may be in the form of a procedure call initiating communication between virtualization software 80 that is executing on source host 60 and virtualization software 130 that is executing on destination host 110.

Next, in operation 206, communication channel abstraction layer 87 (FIG. 3) establishes multipath communication to the other host. Once this communication link is established, the migration handler 86 begins precopy of the guest physical pages of the VM being migrated.

The procedure then flows to decision block 208 where it is determined whether RDPI mode has been initiated. In one embodiment, the communication channel abstraction layer is used only during RDPI, in which case this decision block is not needed and the procedure flows immediately to operation 214. However, in another embodiment, communication channel abstraction layer 87 may be explicitly or implicitly informed that RDPI mode has initiated, which would then trigger multipathing logic to provide a redundant communication link during this critical period. For example, communication channel abstraction layer 87 may listen for communications between the hosts indicating that RDPI mode is initiated. If RDPI mode has not initiated, then the procedure flows to operation 218, which determines whether live migration is complete. If not, the procedure flows to operation 220.

Operation 220 is an operation that may be external to communication channel abstraction layer 87, and in one embodiment, is carried out by live migration handler 86. However, during precopy and RDPI phases of live migration, communication channel abstraction layer 87 continues to process messages between the source and destination hosts on behalf of live migration handler 86. At some point during precopy, live migration handler 86 may determine that the set of guest physical pages that remain dirty in each iteration of the precopy process is not converging to a small enough set such that RDPI becomes necessary. In this case, live migration handler 86 may stun the VM on the source host 60 and immediately resume the VM on the destination host without completely copying all the guest physical memory to the destination host, therefore entering RDPI mode.

Returning to operation 208, if the live migration is in RDPI mode, then the procedure flows to operation 214, wherein it is determined whether the network has failed or is significantly degraded such that a failover to the storage datapath is necessary or desired. If not, then the procedure flows back to operation 218 as previously described. If so, then the procedure flows to operation 216 where the failover to the shared storage datapath is initiated. In one embodiment, the failover is one-way so that if network connection resumes, the communication between the source and destination hosts persists over the shared storage datapath. However, in another embodiment, the multipathing logic can "fail back" to the network datapath if network connectivity is restored. If live migration is complete at operation 218, then the procedure ends as indicated by done block 222.

In one embodiment, a load balancing mode may be implemented or engaged. The load balancing mode may be provided as a configuration option, or it may be implemented by default. If the load balancing mode is engaged, then some guest physical pages may be streamed over the network and some written to the multiwriter file, during the precopy phase as well as the RDPI phase of the live migration. Load balancing mode may track and respond to network conditions or storage latency to achieve overall maximum throughput using a load balancing algorithm. It should be recognized that the alternate datapath can be used for load balancing only, failover only, or both load balancing and failover.

Although not illustrated in FIG. 4, should the network fail during precopy phase, the live migration may simply fail with the VM continuing to execute normally on the source host. If this happens, live migration may be attempted again at a later time, either to the same destination host or a different destination in an automated manner, depending on the configuration of the virtualization infrastructure management system. The embodiments described above with reference to FIGS. 3 and 4 require that the source host be "live," i.e., functioning, during RDPI. That is, should the source host fail for some reason during RDPI, it could cause the VM already running on the destination host to fail as well if the source host fails before all the guest physical memory is transferred to the destination. This vulnerability may be mitigated, for example, as described below with reference to FIGS. 5A and 5B.

Figure 5A:
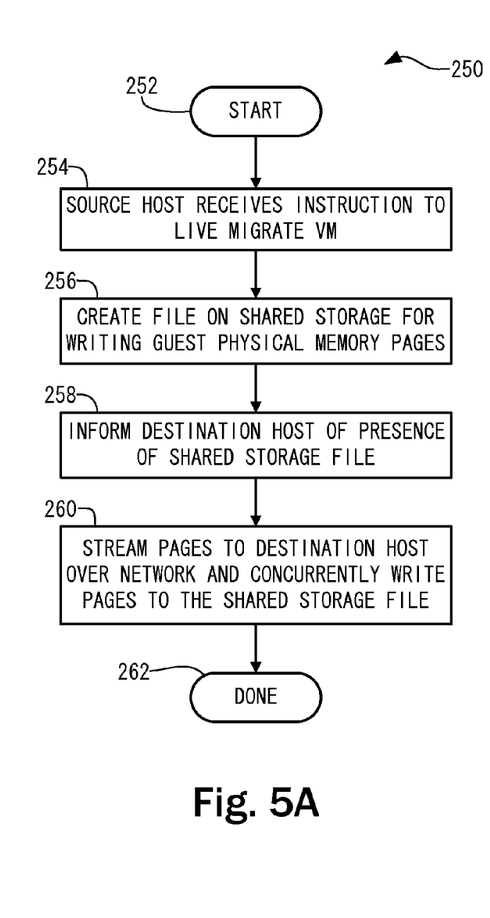
FIGS. 5A and 5B show flowcharts illustrating by way of example an alternate embodiment for protecting the VM executing in RDPI mode from failure of the source host during RDPI.
Figure 5B:
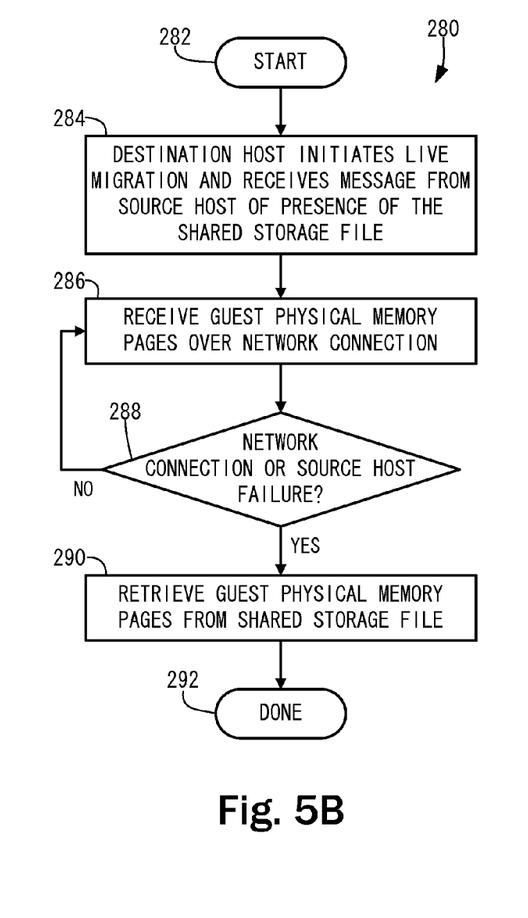

FIGS. 5A and 5B show flowcharts 250 and 280 illustrating by way of example an alternate embodiment for protecting the VM executing in RDPI mode from failure of the source host during RDPI. Referring now to FIG. 5A, an exemplary procedure is illustrated that may be carried out by a source host. The procedure begins as indicated by start block 252 and proceeds to operation 254 where the source host receives an instruction to live migrate a VM that is executing on the source host. This communication can originate over network 100 (FIG. 1) as previously described. The source host then creates a file at storage location commonly accessible by both the source and destination hosts in operation 256 and in operation 258 informs the destination host of the presence of the shared storage file. The procedure then flows to operation 260 in which the source host begins streaming pages to the destination over network 100 and concurrently writes guest physical pages to the shared storage file. After all the guest physical pages are transferred, the procedure ends as indicated by done block 262.

In one embodiment, the guest physical pages are streamed in order from the first guest physical page not present on the destination host to the last, while the guest physical pages are written to the shared storage file in reverse order from the last guest physical page not present on the destination host to the first. In this way, if the source host fails before all the pages are transferred over the network connection, the remaining pages are likely to be available and accessible from the shared storage file.

FIG. 5B shows a flow chart 280 illustrating by way of example a procedure carried out by the destination host during live migration. The procedure begins as indicated by start block 282 and flows to operation 284 wherein the destination host initiates live migration and receives the message from the source host described above with reference to block 258 in FIG. 5A regarding the presence and location of the shared storage file. The procedure then flows to operation 286 where the destination host begins to receive guest physical memory pages over the network connection. Then in operation 288 it is determined whether the network connection or source host fails, and if not the procedure returns to operation 286 to continue receiving guest physical memory pages until they are all received. If, in operation 288, it is determined that a network or source host failure has occurred, e.g., by the lapse of a timeout period without communication from the source host, then the procedure flows to operation 290 wherein the remaining guest physical memory pages are retrieved from the shared storage file. The procedure then ends as indicated by done block 292.

The various embodiments described herein may employ various computer-implemented operations involving data stored in computer systems. For example, these operations may require physical manipulation of physical quantities usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs) CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

In addition, while described virtualization methods have generally assumed that virtual machines present interfaces consistent with a particular hardware system, persons of ordinary skill in the art will recognize that the methods described may be used in conjunction with virtualizations that do not correspond directly to any particular hardware system. Virtualization systems in accordance with the various embodiments, implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention (s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

We claim:

1. A method for transferring guest physical memory from a source host to a destination host during live migration of a virtual machine (VM) to which the guest physical memory is associated, the source host being a first computer hosting the VM prior to the live migration and the destination host being a second computer hosting the VM after the live migration completes, the method comprising:
    transmitting pages of the guest physical memory from the source host to the destination host over a network connection that places the source and destination hosts in communication with each other;
    transferring state information from the source host to the destination host;
    after transferring the state information to the destination host and before all of the pages of the guest physical memory have been copied to the destination host, running the VM on the destination host in place of running the VM on the source host; and
    while the VM is running on the destination host, writing pages of the guest physical memory from the source host to a shared datastore such that the destination host can retrieve one or more pages of the guest physical memory from the shared datastore.

2. The method of claim 1, wherein the transmitting of the pages of the guest physical memory over the network occurs in a first order of guest physical memory pages and the writing of the pages to the guest physical memory occurs in a reverse order, the reverse order being a reverse of the first order.

3. The method of claim 1, wherein a load balancing algorithm is employed to balance transferring of guest physical memory over both a first datapath comprising the network connection and a second datapath to the shared datastore, the shared datastore enabling bidirectional communication between the source host and the destination host.

4. The method of claim 1, wherein the guest memory pages are written to the shared datastore as a multiwriter file enabling bidirectional communication between the source host and the destination host.

5. The method of claim 4, further comprising:
    writing the pages of guest physical memory to the multiwriter file when a network failure or network degradation is detected.

6. The method of claim 1:
    wherein the guest memory pages are written to the shared datastore as a multiwriter file;

wherein the network connection is a first datapath for the transmitting of the pages of the guest physical memory from the source host to the destination host and the multiwriter file is along a second datapath for the writing of the pages of the guest physical memory; and wherein the pages of guest physical memory are transferred to the destination host over the first and second datapath concurrently using a load balancing algorithm.

7. The method of claim 1, the method further comprising:
while the VM is running on the destination host, transmitting pages of the guest physical memory from the source host to the destination host over the network connection, and upon detecting whether the network connection fails or is degraded, switching to the process of writing pages of the guest physical memory from the source host to the shared datastore.

8. A non-transitory computer readable storage medium storing instructions that when executed by a computer system cause the computer system to perform a method for transferring guest physical memory from a source host to a destination host during live migration of a virtual machine (VM) to which the guest physical memory is associated, the source host being a first computer hosting the VM prior to the live migration and the destination host being a second computer hosting the VM after the live migration completes, the method comprising:

transmitting pages of the guest physical memory from the source host to the destination host over a network connection that places the source and destination hosts in communication with each other;

transferring state information from the source host to the destination host;

after transferring the state information to the destination host and before all of the pages of the guest physical memory have been copied to the destination host, running the VM on the destination host in place of running the VM on the source host; and while the VM is running on the destination host, writing pages of the guest physical memory from the source host to a shared datastore such that the destination host can retrieve one or more pages of the guest physical memory from the shared datastore.

9. The non-transitory computer readable storage medium of claim 8, wherein the transmitting of the pages of the guest physical memory over the network occurs in a first order of guest physical memory pages and the writing of the pages to the guest physical memory occurs in a reverse order, the reverse order being a reverse of the first order.

10. The non-transitory computer readable storage medium of claim 8, wherein a load balancing algorithm is employed to balance transferring of guest physical memory over both a first datapath comprising the network connection and a second datapath to the shared datastore, the shared datastore enabling bidirectional communication between the source host and the destination host.

11. The non-transitory computer readable storage medium of claim 8, wherein the guest memory pages are written to the shared datastore as a multiwriter file enabling bidirectional communication between the source host and the destination host.

12. The non-transitory computer readable storage medium of claim 11, wherein the method further comprises:
writing the pages of guest physical memory to the multiwriter file when a network failure or network degradation is detected.

13. The non-transitory computer readable storage medium of claim 8:
wherein the guest memory pages are written to the shared datastore as a multiwriter file;

wherein the network connection is a first datapath for the transmitting of the pages of the guest physical memory from the source host to the destination host and the multiwriter file is along a second datapath for the writing of the pages of the guest physical memory; and wherein the pages of guest physical memory are transferred to the destination host over the first and second datapath concurrently using a load balancing algorithm.

14. The non-transitory computer readable storage medium of claim 8, the method further comprising:
while the VM is running on the destination host, transmitting pages of the guest physical memory from the source host to the destination host over the network connection, and upon detecting whether the network connection fails or is degraded, switching to the process of writing pages of the guest physical memory from the source host to the shared datastore.

15. A system, comprising:
a source host computer having a virtual machine (VM) executing therein;
a destination host computer;
a shared datastore accessible to the source and destination hosts; and
a network connection that places the source and destination hosts in communication with each other, wherein
the source host is programmed to perform a method for transferring guest physical memory associated with the VM from the source host to the destination host during live migration of the VM, the source host hosting the VM prior to the live migration, and the destination host hosting the VM after the live migration completes, the method comprising:

transmitting pages of the guest physical memory from the source host to the destination host over the network connection;

transferring state information from the source host to the destination host;

after transferring the state information to the destination host and before all of the pages of the guest physical memory have been copied to the destination host, running the VM on the destination host in place of running the VM on the source host; and while the VM is running on the destination host, writing pages of the guest physical memory from the source host to the shared datastore such that the destination host can retrieve one or more pages of the guest physical memory from the shared datastore.

16. The system of claim 15, wherein the transmitting of the pages of the guest physical memory over the network occurs in a first order of guest physical memory pages and the writing of the pages to the guest physical memory occurs in a reverse order, the reverse order being a reverse of the first order.

17. The system of claim 15, wherein a load balancing algorithm is employed to balance transferring of guest physical memory over both a first datapath comprising the network connection and a second datapath to the shared datastore, the shared datastore enabling bidirectional communication between the source host and the destination host.

18. The system of claim 15, wherein the guest memory pages are written to the shared datastore as a multiwriter file enabling bidirectional communication between the source host and the destination host.

19. The system of claim 18, wherein the method further comprises:
   writing the pages of guest physical memory to the multiwriter file when a network failure or network degradation is detected.

20. The system of claim 15:
   wherein the guest memory pages are written to the shared datastore as a multiwriter file;
   wherein the network connection is a first datapath for the transmitting of the pages of the guest physical memory from the source host to the destination host and the multiwriter file is along a second datapath for the writing of the pages of the guest physical memory; and
   wherein the pages of guest physical memory are transferred to the destination host over the first and second datapath concurrently using a load balancing algorithm.

* * * * *